(12) United States Patent
Filhol et al.

(10) Patent No.: US 7,408,695 B2
(45) Date of Patent: Aug. 5, 2008

(54) ELECTRICALLY ROTATIONALLY ACTUATABLE MICRO-MIRROR OR MICRO LENS

(75) Inventors: Fabien Filhol, St. Egrive (FR); Claire Divoux, Anney (FR)

(73) Assignee: Commissariat a l'Energie Atomique, Paris (FR)

( * ) Notice: Subject to any disclaimer, the term of this patent is extended or adjusted under 35 U.S.C. 154(b) by 35 days.

(21) Appl. No.: 10/570,586

(22) PCT Filed: Sep. 7, 2004

(86) PCT No.: PCT/FR2004/002265

§ 371 (c)(1),
(2), (4) Date: Nov. 13, 2006

(87) PCT Pub. No.: WO2005/026814

PCT Pub. Date: Mar. 24, 2005

(65) Prior Publication Data

US 2007/0091406 A1   Apr. 26, 2007

(30) Foreign Application Priority Data

Sep. 8, 2003   (FR)   ................................... 03 50508

(51) Int. Cl.
G02B 26/00 (2006.01)
G02B 26/08 (2006.01)

(52) U.S. Cl. .................. 359/290; 359/198; 359/210; 359/225

(58) Field of Classification Search ............... 359/198, 359/210, 214, 215, 224, 225, 290, 292, 295, 359/298
See application file for complete search history.

(56) References Cited

U.S. PATENT DOCUMENTS 6,115,231 A   9/2000   Shirakawa ................ 361/233

6,633,212 B1 * 10/2003 Ruan et al. ................ 335/78

FOREIGN PATENT DOCUMENTS

EP   1193528   4/2002

OTHER PUBLICATIONS

Search Report (French Preliminary) FR 0350508000 (Sep. 8, 2003).
Senturia, J.R. Gilbert, et al., "Two-Phase Actuators: Stable Zipping Devices Without Fabrication Of Curved Structures", Solid-State Sensor and Actuator Workshop, Jun. 1996, Hilton Head S.C., (pp. 98-100).
Schwart, Wilfrid, et al., "A Micromachined Deformable Mirror For Adaptive Optics", Moems And Miniaturized Systems III, Proc. Of SPIE vol. 498, vol. 4983 (Jan. 29, 2003), pp. 230-241.
Patterson, Pamela R., et al., "A Scanning Micromirror With Angular Comb Drive Actuation", (2000 IEEE), pp. 544-547.

* cited by examiner

*Primary Examiner*—William C Choi
(74) *Attorney, Agent, or Firm*—Thelen Reid Brown Raysman & Steiner LLP

(57) ABSTRACT

Micro-mirror or micro-lens made up of a moving part (10) with a reflective or refringent zone (17), a fixed part (14), means of connection (13) of the moving part (10) to the fixed part (14) which forms an axis of rotation (12) for the moving part (10) and of means for controlling (18) the rotation. The means of control include two or more actuators (19) arranged either side of the axis (12), each formed of a fixed electrode (20) forming part of the fixed part (14) and a moving electrode (21) possessing a free end (21.1) and an end connected to a drive arm (23) which is substantially parallel to the axis (12) and emerging from the moving part (10). The moving electrode (21) adheres to the fixed electrode (20) from its free end (21.1) when a voltage is applied to the actuator (19), the adhesion is a function of the applied voltage.

Application to optical systems.

63 Claims, 11 Drawing Sheets

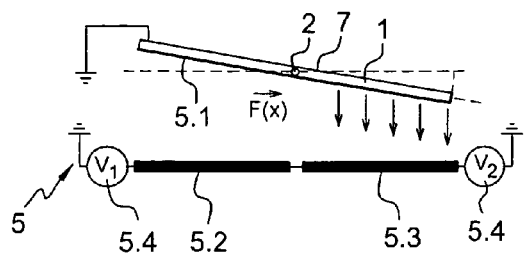
Fig. 1A
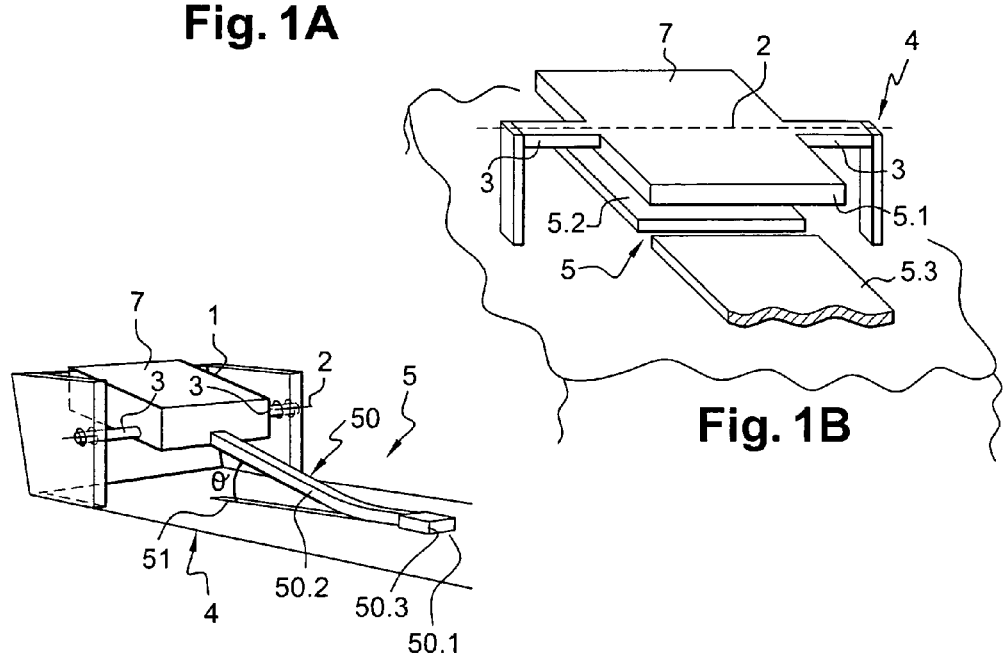
Fig. 1B
Fig. 2A
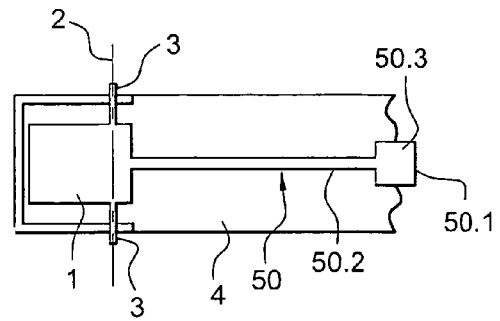
Fig. 2B

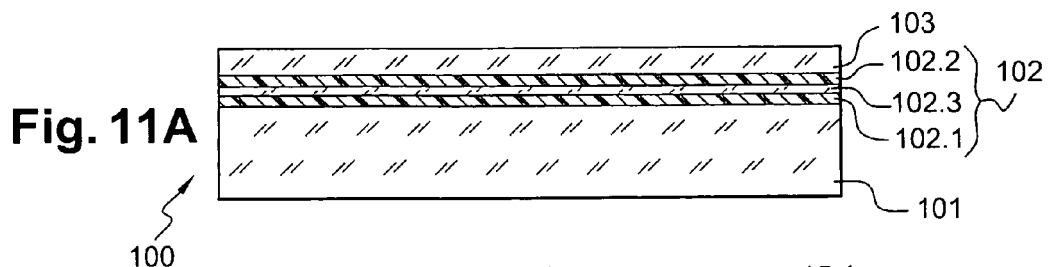
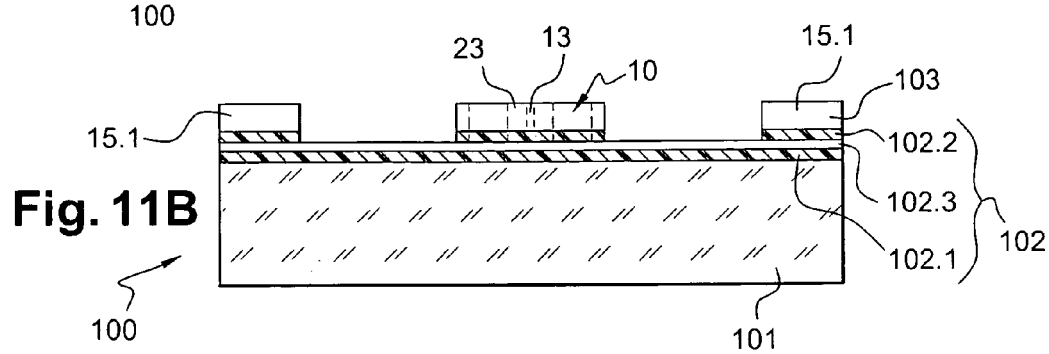
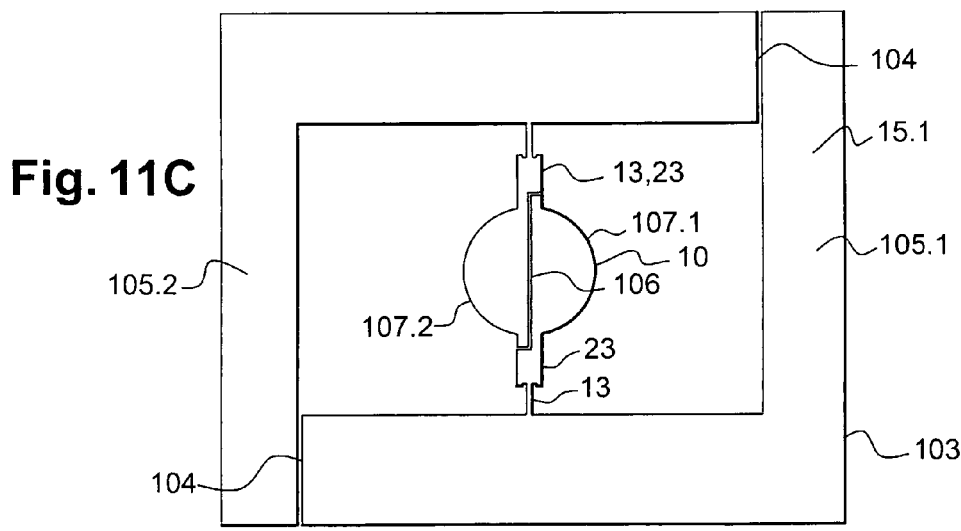
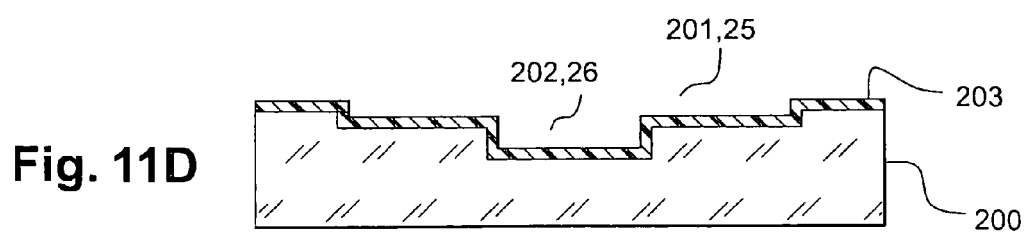

US 7,408,695 B2

ELECTRICALLY ROTATIONALLY ACTUATABLE MICRO-MIRROR OR MICRO LENS

CROSS-REFERENCE TO RELATED APPLICATION

This application claims priority based on International Patent Application No. PCT/FR2004/002265, filed on Sep. 7, 2004 entitled "Electrically Rotationally Actuatable Micro-Mirror or Micro Lens" by Fabien Filhol and Clarie Divous, which claims priority of French Application No. 0350508, filed on Sep. 8, 2003, and which was not published in English.

TECHNICAL FIELD

The present invention relates to a micro-mirror or micro-lens capable of being electrically actuated in rotation. Micro-mirrors or micro-lenses produced using techniques of micro-machining of semi-conductor material are of great interest for the reflection or transmission of a beam of light because of a combination of their rapidity, their precision, low power consumption and relatively low cost.

Such micro-mirrors or micro-lenses can operate in two different ways, which are a static or quasi-static mode and an oscillating mode. Micro-mirrors are made up of a moving part, generally in the form of a plate, which possesses a reflective zone. Micro-lenses include an open-work moving part (that is, in the form of a frame) to which is fixed a refringent lenticular component which forms a refringent zone.

In the first mode the moving part can take up positions where it is inclined at a fixed angle in relation to a rest position where it may move in rotation, with its movement having a very small frequency in comparison with its resonance frequency. In this first mode the reflected or transmitted light beam, depending on whether a micro-mirror or micro-lens is involved, is directed towards a user device and the field of application is, for example, optical routing systems or image protection systems.

In the second mode of operation the moving part oscillates at its resonance frequency and the reflected or transmitted light beam performs a periodic sweep with an amplitude which is increased by the effects of mechanical resonance. The field of application is, for example, scanners in printers or bar-code readers. In this mode of operation, micro-mirrors may also be used in new applications such as displays using light beams sweeping over the retina or confocal endoscopic microscopes.

THE EXISTING TECHNICAL SITUATION

Such micro-mirrors or micro-lenses traditionally include a moving part, usually in the form of a plate, possessing a principal plane and which possesses at least one reflective zone for micro-mirrors and one refringent zone for micro-lenses, a fixed part, means for connection of the moving part to the fixed part which form an axis which is substantially parallel to the principal plane and means of electrical control of the rotation of the moving part about the axis.

The optical quality of micro-mirrors essentially depends on the flatness of their reflective zones. That of the micro-lenses depends on the precision of the shape of the lens, a near-spherical shape for example.

The moving part of the micro-mirrors usually includes a micro-machined plate made of semi-conductive material which forms the reflective zone or which is covered with at least one reflective layer and possibly a protective layer. For micro-lenses the moving part includes an open-work plate which supports a lenticular refringent component. Deformations in the surface may be induced by elements located beneath the reflective zone or beneath the open-work plate which supports the lenticular component. These elements, such as electrodes, are very often used to produce movement of the moving part, stresses in the superficial layer or layers of the moving part (for example the reflective metal layer or the protective layer) and the dynamic deformations which occur during the movement of the moving part.

The use of single-crystal silicon with a thickness of a few tens of micrometers means that moving parts which are of adequate flatness can be obtained. Such a thickness range means that the deformations caused by acceleration during movement or by stresses introduced by the superficial layer or layers can be avoided.

The size of the reflective zone must be sufficient to limit the effect of diffraction of the light beam on its opening. Typically micro-mirrors with a span of more than 500 micrometers are used. Naturally such dimensions do not constitute a restriction, but in fact depend on the application. These constraints on dimensions are applicable to micro-lenses.

These micro-mirrors and micro-lenses are therefore intended to move in rotation about an axis which is substantially parallel to their principal plane. Two or more micro-mirrors may be used in the same assembly to deflect the light beam several times. The same remarks apply to micro-lenses.

Micro-mirrors are known which are capable of being actuated in rotation by an electrostatic effect such as that illustrated in FIGS. 1A, 1B. The moving part 1 is mounted on a rotating axis 2 constructed using two aligned torsion arms 3 emerging from moving part 1 and whose ends form part of a fixed part 4. The moving part 1 faces the fixed part 4 whilst being separated from it in the rest position, and is shown by the broken lines in FIG. 1A. It is suspended above the fixed part 4 by torsion arms 3. Means of electrical control 5 are provided to move the moving part 1 in rotation. They are made up of a moving electrode 5.1 and two fixed counter-electrodes 5.2. The face of moving part 1 located opposite the fixed part 4 carries the moving electrode 5.1. The other face of the moving part 1 carries a reflective zone 7. The fixed part 4 carries the two counter-electrodes 5.2, 5.2 which face the moving electrode 5.1. The means 5 for controlling the movement in rotation of moving part 1 also include an addressing device (shown by the voltage sources) for applying an addressing signal in the form of an actuation voltage V1 or V2 between the moving electrode 5.1 and one or the other of counter electrodes 5.2, 5.3. During the application of such an actuation voltage V1 or V2, an electrostatic attraction force F(x) is generated and the moving part 1 moves in rotation about the axis 2, with the moving electrode 5.1 being attracted by the counter-electrode 5.2 or 5.3 which generated the difference in potential V1 or V2.

One problem posed by electrostatic actuation is that the elastic return force (not shown) produced by the torsion arms 3 and which opposes the movement of the moving part is linear, whilst the electrostatic attraction force is quadratic. Furthermore, when the moving part 1 has travelled about a one-third of the distance which when at rest separates the moving electrode 5.1 from the counter electrode 5.2 or 5.3, the force of attraction predominates and produces a sudden adhesion effect on the electrodes when the difference in potential exceeds certain threshold Vc or "pull in" voltage (literally the attraction threshold voltage). Before the potential difference reaches the "pull in" voltage, the response of the moving part (that is, the angle of rotation as a function of the voltage) is not linear, which complicates the control.

Consequently the travel governed by the moving electrode corresponds to a distance -which is greatly restricted in relation to the initial distance which separates the moving electrode 5.1 from the counter-electrodes 5.2, 5.3 in the rest position. This phenomenon limits the useable angular displacement of the moving part 1. A small space at rest between the moving electrodes and counter-electrodes only allows movement over a very restricted angle, and the provision of a large space at rest implies that a very high actuating voltage be used, which is not desirable. Furthermore, the angular displacement of the moving part is relatively limited.

Document [1] referenced at the end of the description, shows another construction option for a rotating micro-mirror capable of movement in a single direction during the attraction between two electrodes. This construction option is illustrated in FIGS. 2A, 2B. The micro-mirror is substantially the same structure as previously with a fixed part 4, a moving part 1 located at rest at a distance from fixed part 4, possessing a reflective zone 7 and an axis of rotation 2 made using two torsion arms 3 whose ends form part of the fixed part 4 and which emerge from the moving part 1. The difference from the previous example is due to the means for electrical control 5 of the rotation of the moving part 1. The means of electrical control 5 include a moving electrode 50 which emerges from the moving part 1 and which possesses a free end 50. 1 and a fixed electrode 51 carried on the fixed part 4, facing the moving electrode 50 in the rest position. The moving electrode 50 is fastened to one edge of the moving part 1. The means of electrical control 5 also include an addressing device in order that an addressing signal in the form of an actuation voltage may be applied between the fixed electrode 51 and moving electrode 50. These means are ,not represented so as not to overload the diagrams. The moving electrode 50 is relatively flexible, and is intended to gradually adhere onto fixed electrode 51 from its free end 50.1. The moving electrode 50 is substantially orientated perpendicularly in relation to the axis of rotation 2. The progressive adhesion effect between the moving electrode 50 and the fixed electrode 51 is known by the name of the "zipping effect". An electrically insulating layer (not visible in the figures) is usually placed between the fixed electrode 51 and the moving electrode 50 in order to prevent the occurrence of short circuits. The moving electrode 50 generally includes a body 50.2 which ends in a stub 50.3 at its free end 50.1. The width of the stub 50.3 is greater than the width of the body 50.2 of the moving electrode.

At rest the fixed electrode 51 and moving electrode 50 are at a distance from each other. When the addressing device supplies an addressing signal, that is, an actuation voltage, between the moving electrode 50 and fixed electrode 51, as long as this voltage is less than the attraction threshold voltage Vc the moving electrode starts to approach the fixed electrode 51. When the actuation voltage reaches a value of Vc a part of the moving electrode 50 which substantially corresponds to the stub 50.3 adheres to fixed electrode 51. The moving part 1 is inclined at an angle of $\theta$ relative to the position it had at rest before the application of the actuation voltage. This angle is greater than a minimum angle $\theta$ min whose significance will be explained later on. The more that the actuation voltage between both electrodes 50, 51 increases, the greater the length of moving electrode 50 that adhering to fixed electrode 51 becomes, and the more the moving part 1 of the micro-mirror moves in rotation about the axis 2. The angle of inclination $\theta$ of the moving part 1 and therefore of the reflective zone 7 is substantially proportional to the actuation. voltage applied between fixed electrode 51 and moving electrode 50. When the actuation voltage decreases, the moving part adopts the same behaviour as previously but in a reverse direction, until the actuation voltage reaches a minimum value Vd (<<pull out >> voltage, or separation threshold) which allows the end 50.1 of the moving electrode 50 to remain just adhered to the fixed electrode 51. This voltage vd is less than voltage Vc. When this voltage is applied, the moving part 1 is inclined at an angle $\theta$ min. When the actuation voltage decreases to below Vd, the moving electrode 50 separates from fixed electrode 51 and the moving part 1 returns to its substantially horizontal rest position. FIG. 2C shows the response curve (angle of rotation $\theta$ as a function of the actuation voltage V applied between the fixed electrode 51 and moving electrode 50) of such a micro-mirror.

In relation to the previous example with classical electrostatic actuation, the actuation voltage for a given angle of rotation can be reduced. There is good linearity between the actuation voltage and the angle of inclination of the moving part, which allows precise orientation of the moving part to be easily achieved. The force developed by the movement of the moving part is inversely proportional to the square of the distance which separates the moving electrode from the fixed electrode. This distance is very small around the adhered part of the moving electrode. This force is therefore very large in the operating range of the micro-mirror. This distance is at least equal to the thickness of the dielectric layer covering the fixed electrode. It is therefore possible to rotate the moving part through angles of the order of 10 degrees with a moderate voltage of typically less than about 100 V. In the rest position the moving electrode must not be too far away from the fixed electrode (a few micrometers to several tens of micrometers) in order to restrict the actuation tension, since the electrostatic force generated during the application of the actuation voltage decreases rapidly as the distance between the two electrodes increases. One drawback of such a device is that the moving part cannot move in rotation to one side and the other of the moving part. Another drawback of this type of actuation is that the moving part cannot take up certain orientations. These orientations correspond to angles $\theta$ which are strictly between $\theta$ and $\theta$min:

It can be noted from FIGS. 2A, 2B that the axis of rotation 2 is offset in relation to the geometric centre of moving part 1. This offset is such that it is closer to the moving electrode 50. This specific feature means that the angular displacement of the moving part 1 can be increased whilst delaying the instant at which it comes into contact with the fixed part 4 which supports the fixed electrode 51. Even with this specific feature, however, the moving part 1 still exhibits a limited angular displacement. There is therefore a tendency to reduce the size of the moving part 1, but a compromise must be found between angular displacement and the size of the reflective zone; the latter must be of a size which is appropriate for the optical functions that it has to fulfill. It is often desirable for the reflective zone 7 to have a span of between a few hundred micrometers and a few millimetres. The same compromise must be found for the size of the refringent zone in a microlens. Another drawback of this configuration is that it risks introducing a vertical component to the movement of the centre of the reflective zone 7. This could give a lateral translation movement to a reflected light beam resulting from a light beam which is incident in this area.

Additional information on micro-mirrors which use "zipping" effect actuating devices is to be found in document [2] also referenced at the end of the description. In this document, the objective of the means of control is to deform the micro-mirror rather than to move it in rotation.

Document [3], whose reference is given at the end of the description, describes a micro-mirror in which the means of electrical control of rotation include several pairs of interdigital electrodes 7.1, 7.2 in the form of combs. In a pair of electrodes, one of the comb electrodes 7.2 forms part of the fixed part 4. The other electrode 7.1 forms, via a hinge 8.1, part of an arm 8 emerging from moving part 1. This arm 8 is parallel to the torsion arm 3 forming part of fixed part 4 which forms part of the axis of rotation. This type of actuation is very effective in oscillating mode due to the mechanical resonance effect, but is not suited for operation in the static or quasi-static mode. In the static or quasi-static mode this type of operation is more effective than standard electrostatic actuation, but is inadequate for obtaining large angles of rotation.

The fact that the moving interdigital electrode forms part of an arm 8 which is not the torsion arm has the drawback of distancing the interdigital electrode from the axis of rotation and therefore of reducing the maximum angular displacement for a given actuation voltage.

EXPLANATION OF THE INVENTION

The purpose of the present invention is to propose a micro-mirror or micro-lens capable of taking up one or more static or quasi-static positions in rotation which does not exhibit the above limitations and difficulties. These limitations apply equally to micro-lenses.

More precisely, one purpose of the invention is to provide a micro-mirror or micro-lens which is capable of moving in rotation with large amplitude and which can take up a precise fixed position whilst retaining a low actuation voltage.

Another purpose of the invention is to supply a micro-mirror or micro-lens which can take up an angle of inclination in a wide angular range, with this range being continuous and extending on both one side and the other of its rest position, which corresponds to a null angle of inclination.

Another purpose of the invention is to provide a micro-mirror or micro-lens capable of taking up a position which does not risk introducing a vertical component to the movement of the central part of the reflective zone of the micro-mirror or of the refringent zone of the micro-lens, where this central zone is generally that at which a light beam is reflected or transmitted.

Another purpose of the invention is to provide a micro-mirror or micro-lens whose moving part is of greater dimensions than those of standard micro-mirrors or micro-lenses.

In order to achieve this the present invention proposes a micro-mirror or micro-lens which includes a moving part with a reflective zone or refringent zone respectively, a fixed part, means of connection of the moving part to the fixed part which forms an axis of rotation contained in the moving part which is substantially parallel to a principal plane of the moving part and means of electrical control of the rotation of the moving part about the axis. According to the invention the means of electrical control includes two or more actuators, each formed from an electrode which forms part of the fixed part, and a moving electrode equipped with a free end and an end connected to a drive arm which is substantially parallel to the axis and which emerges from the moving part, with the moving electrode being designed to adhere onto the fixed electrode from its free end once an actuation voltage is applied between the two electrodes of one of the actuators, with the adhesion taking place over a surface area which varies as a function of the voltage applied between the electrodes and the actuator, with the actuators being arranged on either side of the axis.

Thus the moving part moves in rotation with maximum amplitude which is double that which exists in the configuration described in document [1]. An amplitude superior to about plus or minus 10 degrees can be obtained; that is, a total of 20 degrees.

The means of connection of the moving part to the fixed part may be two torsion arms emerging from the moving part whose ends are connected to the fixed part.

In a manner which is advantageous the axis may pass through the geometric centre of the moving part, which prevents a vertical component being introduced into the movement of the central zone of the moving part.

It is possible for a drive arm be offset in relation to the torsion arm on the same side of the moving part. But it is particularly advantageous for increasing the angular displacement for a torsion arm and a drive arm to be an extension of each other.

In this last configuration, in order to maintain both flexibility in torsion and stiffness in vertical flexion, it is preferable that at least one torsion arm has a transverse section less than that of a drive arm.

It is naturally possible for a torsion arm and a drive arm, each of which are found in the extension of the other, to substantially have the same transverse sectional area, so that both arms are then combined.

In one particularly effective manufacturing option, several moving electrodes may be connected to a given drive arm.

In another option for manufacture, each drive arm may be integral with a single moving electrode.

In yet another option for manufacture which improves the precision of the position taken by the moving part, several moving electrodes located on the same side of the axis are connected together at their free ends.

In order to render the micro-mirror or micro-lens more compact, it is possible for a moving electrode to be wound onto itself, with its free end being located in a central zone of the winding.

A rectilinear configuration of a moving electrode is also possible.

A moving electrode configuration which allows the voltage required to produce adhesion of the moving electrode onto the fixed electrode of an actuator to be reduced is one in which the moving electrode includes a body with an substantially constant width extending by means of a stub at its free end, with the width of the stub being greater than that of the body.

It is possible for fixed electrodes to be combined, which in this configuration facilitates addressing carried out by the moving electrodes.

The fixed part may include a base and columns on which the means of connections of the moving part to the fixed part rests, with the moving part being suspended above the base.

In order to increase the angular displacement of the moving part, the base may include a cavity opposite the moving part which is then suspended above the recess.

In order to prevent short circuiting between the electrodes of the actuators, the fixed electrodes may be covered with a dielectric material.

The means of control may include an addressing device capable of applying an actuating voltage to the moving electrodes and/or the fixed electrodes of an actuator.

The actuation voltage may be continuous voltage added to a variable control voltage.

In order to simplify control of rotation, it is possible for at least one fixed electrode of an actuator to be divided into two portions one of which is an end portion, with these two portions being insulated from each other, with the addressing device being capable of applying a continuous voltage to the end portion and a variable control voltage to the other portion.

The continuous voltage may be a minimal voltage for maintaining adhesion of the free end of the moving electrode of the actuator to the fixed electrode.

When the control voltage applied to an actuator located on one side of the axis is non-zero, the control voltage applied at the same time to an actuator located on the other side of the axis may be zero.

The present invention also relates to a process for manufacturing a micro-mirror or a micro-lens characterised in this way. It involves the following steps:

a) etching of the contour of a first region of the moving part, a first region of the fixed part, a first region of the means for connection of the fixed part to the moving part, a first region of the drive arm in a surface layer and in a first insulating layer of a stratified substrate made up of an alternating stacking of a first and second layer made of insulating material and two semi-conductive layers, one of which is intermediate and the other of which is a surface layer, b) in a second semi-conductive substrate, the etching of a recessed part, with this second substrate contributing to the formation of a second region of the fixed part and the fixed electrodes of the actuators, c) assembly of two substrates, with the recessed part facing the etched surface layer, d) etching of the outline of moving electrodes, of a second region of the moving part, a second region of the drive arm and a second region of the means of connection, in the intermediate layer and the metallization beforehand which is electrically connected to the moving electrodes for the application of actuation voltage to each actuator via the fixed part and the moving part.

According to this process, trenches of insulation could be made during step a) in the surface layer and in the upper insulation layer in the first region of the fixed part and the first region of the moving part and in the intermediate layer during step d) at the moving electrodes and the second region of the moving part, in order to provide electrical insulation of the moving electrodes during the application of actuation voltage to a moving electrode via the first region of the fixed part and the first region of the moving part.

Step b) could include the etching of the cavity in a central part of the recessed-part.

Step b) may be followed by a step for the creation of a layer of insulating material on the second etched substrate.

The second region of the moving part can directly form the reflective zone of the micro-mirror, or a metallization step of the second region of the moving part may be introduced in order to create the reflective zone of the micro-mirror.

Where micro-lenses are involved, the moving part could be etched into the form of a frame during step b).

A lenticular refringent component could be assembled onto the moving part to create the refringent zone.

After assembly in step c) the second insulating layer could be removed.

The surface layer thickness is chosen to be thicker than the intermediate layer so as to obtain suitable torsion characteristics for the torsion arm.

The first substrate could advantageously be a double substrate SOI and include next to the second insulating layer a semi-conductive base layer which is removed after assembly of the two substrates.

BRIEF DESCRIPTION OF THE DIAGRAMS

The present inventions will be better understood by reading the description of examples of manufacture which are given for purely informative purposes and which are in no way limitative, whilst referring to the appended diagrams in which:

FIGS. 1A, 1B (already described) show a sectional view and a three dimensional view of a micro-mirror of existing design, capable of being actuated in rotation by electrostatic means;

FIGS. 2A, 2B (already described) show a three dimensional view and a top view of a micro-mirror of existing design capable of being actuated in rotation by the "zipping" effect

FIGS. 11A to 11L represent steps in an example of the process for the manufacture of micro-mirrors or micro-lenses as described in the invention.

The different variants must be understood as not being exclusive of each other.

Identical, similar or equivalent parts of the various figures bear the same numerical references so as to facilitate passage from one figure to another.

In order to make the figures more readable, the various parts represented in the figures are not necessarily according to a uniform scale.

DETAILED DESCRIPTION OF SPECIFIC CONSTRUCTION OPTIONS

Figure 4:
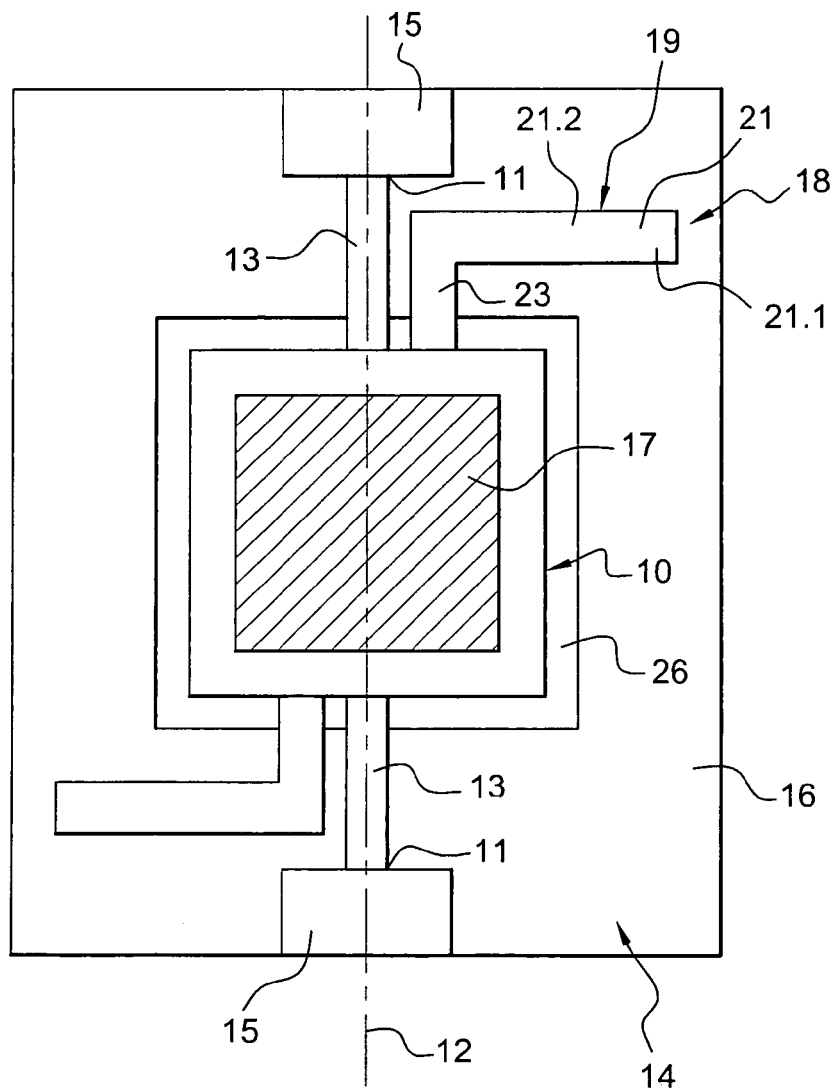
FIG. 4 is a top view of an example of a micro-mirror or micro-lens as described in the invention.
Figure 5A:
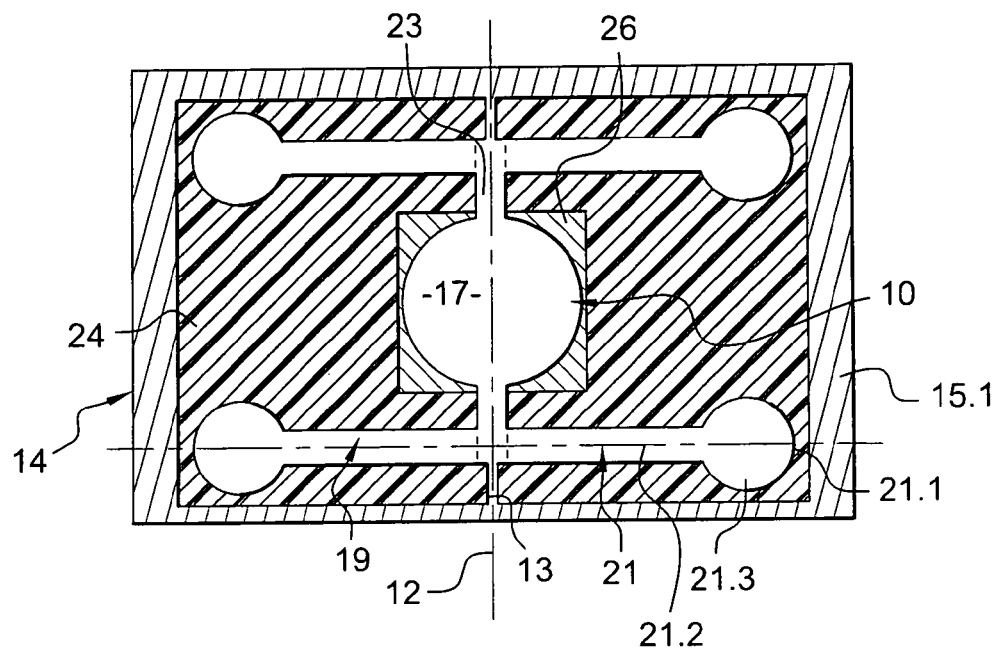
FIGS. 5A, 5B illustrate a top view and a section view of another example of a micro-mirror or micro-lens as described in the invention.
Figure 5B:
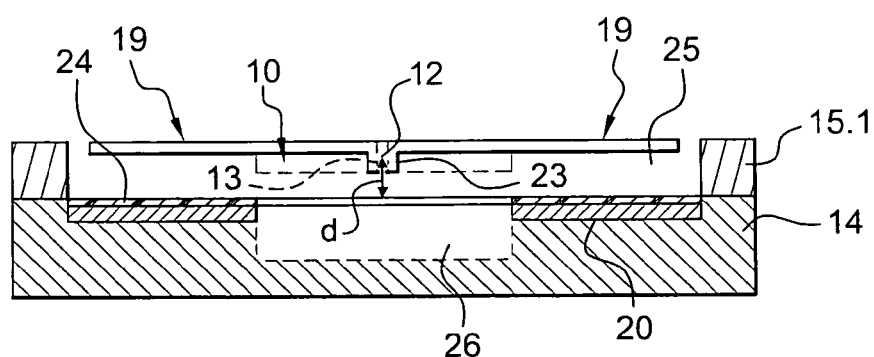

Reference will now be made to FIGS. 4, 5A and 5B which show examples of micro-mirrors or micro-lenses as described in the invention. The micro-mirror or micro-lens includes a moving part 10 and a fixed part 14. The moving part 10 has the overall shape of a plate or of a frame respectively. It is intended to be moved in rotation about an axis 12. The axis passes through the moving part 10 and is substantially parallel to a principal plane of the moving part 10. A means 13 for connection of the moving part 10 to the fixed part 14 form this axis 12. These means of connection may take the form of two torsion arms 13 emerging from the moving part 10 and which have an extremity 11 which forms part (by being embedded, for example) of the fixed part 14 at columns 15. Both torsion arms 13 are an extension of each other. The columns 15 of the fixed part 14 rest on a base 16, which extends beneath the moving part 10. The moving part 10 is thus suspended above the fixed part 14 at its base 16. The moving part 10 includes principal faces one of which is turned towards the fixed part 14 at its base 16 and the other of which is equipped with a reflective zone 17 (hatched in FIG. 4) intended to reflect light in the case of a micro-mirror. The reflective zone 17 is shown as only partly occupying the face of the moving part 10 but it could occupy it completely. In the case of a micro-lens, zone 17 represents a refringent zone; this could involve a lenticular refringent component fixed, for example, by adhesion to the frame 10. The axis 12 could pass though the geometric centre of moving part 10.

The micro-mirror or micro-lens also includes a means 18 for electrical control of the movement of moving part 10 in rotation. This means 18 is made up of at least two "zipping effect" actuators 19 and an addressing device for addressing these actuators (not visible in FIG. 4).

The term "zipping effect" actuator 19 means an actuator formed from a pair of electrodes 20, 21 with a fixed electrode 20 and a moving electrode 21 which has a free end 21.1, with the moving electrode 21 being designed to adhere to fixed electrode 20 from its free end 21.1, with the adhesion occurring over a variable surface area which is a function of the voltage applied between both electrodes. The moving electrode 21 is therefore flexible.

The fixed electrode 20 of the actuators 19 forms part of the fixed part 14 at the base 16. It is not visible in FIG. 4; it is hidden by the moving electrode 21. It can be seen in FIG. 5B. The moving electrode of actuators 19 forms, at its other end, part of a drive arm 23 emerging from moving part 10 and which is substantially aligned in parallel to the axis of rotation 12. This drive arm 23 is of adequate stiffness. Thus moving electrode 21 is no longer directly fixed to moving part 10 as shown in the-examples in FIG. 2, it is offset from it.

One important characteristic is that the free ends 2.1 of moving electrodes 21 of the two actuators 19 are located on either side of the axis of rotation 12. The actuators 19 are therefore arranged on either side of the axis 12. Thus each of the actuators 19 can drive the moving part 10 in one direction or in the other, which allows its angular displacement to be increased in relation to the examples in FIG. 2. Angles greater than about 10 degrees, to either side of the rest position (angle of zero) may be obtained with an actuation voltage which is typically below 100V.

The actuators 19 may be addressed or actuated either separately or simultaneously as will be seen later.

The moving part 10 could have a span of between a few hundred micrometers and a few millimeters and a thickness of about a few tens of micrometers. It must possess sufficient stiffness in the reflective or refringent zone 17 for it at rest to be as stable as possible in order to retain its optical qualities irrespective of the conditions, and in particular during acceleration. It is naturally to be understood that these dimensions are not limitative.

Moving electrode 21 may take the form, from the drive arm 23, of an substantially rectilinear body 21.1 of substantially constant width terminating at its free end 21.1 in an end part 21.3 which may be of the same width as the body 21.2 or which, advantageously, may be wider. In this last case the end part 21.3 may be called a stub. This stub is visible in FIG. 5A. As for the fixed electrode 20, it may have any shape at all as long as moving electrode 21 can adhere to it.

The stub 21.3 is used to reduce the attraction threshold voltage Vc as well as the separation threshold voltage Vd.

When the actuator is at rest, it is not subjected to any actuation voltage. Its' moving and fixed electrodes 20, 21 are separated by a space 25 which may be filled with gas (air or other) or which could be evacuated. This inter-electrode space 25 is shown in FIG. 5B. This space 25 may be delimited by a cavity which contributes to the formation of columns which take the form of a frame as will be seen later.

It is preferable to place a layer of dielectric material 24 in this space laid between the fixed electrodes 20 and moving electrodes 21 to avoid short-circuiting when a moving electrode 21 comes into contact with a fixed electrode 20. This dielectric layer 24 is visible in FIG. 5B, where it covers the fixed electrodes 20. The thickness of the dielectric layer 24 is between a minimum and a maximum value. The minimum value is determined by the breakdown voltage of the insulation when subjected to an electrical field generated by a given actuation voltage, applied between the two electrodes of the actuator. The maximum value is determined by the maximum distance apart at which the two electrodes in an actuator may be placed when the moving part 10 is in he rest position without the attraction force being too small for a. given actuation voltage. For example, for an actuation voltage of 100V, the minimum thickness of the dielectric layer (made, for example from oxide or nitride of a semi-conductor material, such as silicon, for example) will be about 0.2 micrometers.

For information purposes, the moving electrode 21 may have a length of between a few tens of micrometers and a few millimeters, a thickness of between a few tenths of a micrometer and a few micrometers, and a body width 21.2 much greater than its thickness. The thickness makes the moving electrode 21 sufficiently flexible in a direction which is substantially perpendicular to the surface of the base 16. If there is a stub 21.3, the latter is bigger than the width of the body 21.2. At rest the inter-electrode space 25 may be about a few micrometers to a few tens of micrometers.

It is advantageous for the base 16 to include, facing the moving part 10, a recess 26. The moving part 10 is able to enter into this recess 26 when the moving part 10 takes up an inclined position at a large angle. Taking up an inclined position with such an angle of inclination would not be possible in the absence of the recess 26, since the moving part 10 would hit the base 16. The fixed electrodes 20 are located on the base 16 outside the recess 26 so as to preserve the relatively small inter-electrode space in the actuator resting position. The depth of the cavity is selected to be sufficient to allow the moving part to incline at an angle of θmax without colliding with the base 16. The angle θmax corresponds to a maximum angle taken by the moving part when the addressing device (described later) supplies maximum actuation voltage.

The cavity 26 may be a hole passing through the base 16 or only a blind hole in the base 16. If a through hole is involved, it may be made from the face of base 16 intended to receive the fixed electrodes 20 (this face is called the front face) or from the other face of the base 16 which is called the rear face. This cavity 26 will be created by wet etching rather than by dry etching in the material of the base 16, which is generally made of semi-conductor material.

The distance between the axis of rotation 12 and the fixed part 14 at the adhesion surface must be relatively large (for example greater than about 50 micrometers) if a large angle of inclination is desired (for example greater than 5°)

It is possible for the columns supporting the torsion arms 13 to take the form of a frame 15.1 which surrounds the moving part 10 and actuators 19 and which forms part of the base 16. This variant is shown in FIGS. 5A and 5B. This frame 15.1 may help to delimit a cavity. It is preferable to limit the surface occupied by this cavity so as to facilitate a two-substrate sealing step, which will be described later during the description of an example of a process for the manufacture of a micro-mirror or of micro-lens as shown in the invention.

The drive arms 23 may be distinct from the torsion bars 13 as shown in FIG. 4. In this configuration a torsion arm and a drive arm located on the same side of the moving part are offset in relation to each other. It is, of course, not an obligation, as illustrated in FIG. 5A. In this diagram the drive arm 23 is closer to the moving part 10 than the torsion arm 13 which is an extension of it. In the following, unless specifically stated otherwise, a drive arm 23 and a torsion arm 13 are regarded as being extensions of each other.

It is preferable for the connection of the moving electrodes 21 to the drive arms 23 to be made as close as possible to the axis of rotation 12 in order to allow a large angular displacement of the moving part 10 whilst keeping the inter-electrode space 25 of the actuators 19 relatively small.

The actuators 19 may be located on either side of the moving part 10, but it is not obligatory. One could envisage having only a single pair of actuators 19, with the actuators 19 located on the same side of the moving part 10. Referring to FIG. 5A, one could have only two of the four actuators shown, for example those which correspond to the section in FIG. 5B.

Figure 6A:
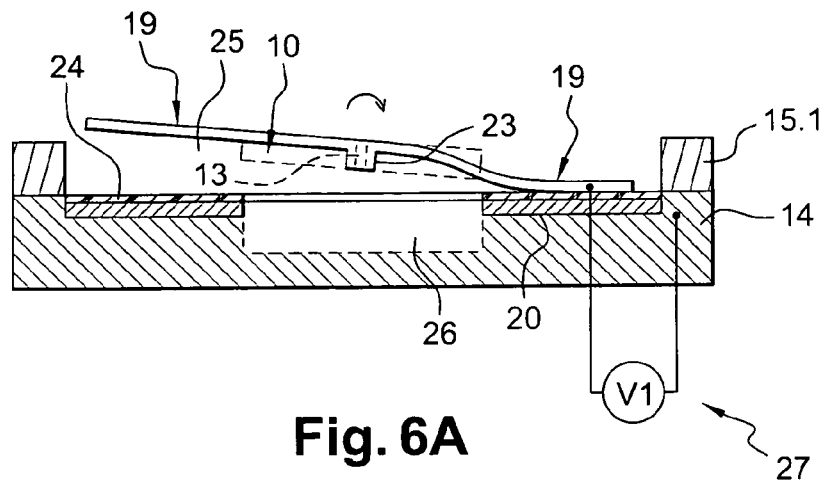
FIGS. 6A, 6B are sections of the micro-mirror or micro-lens in FIG. 5, intended to explain a first mode of operation.
Figure 6B:
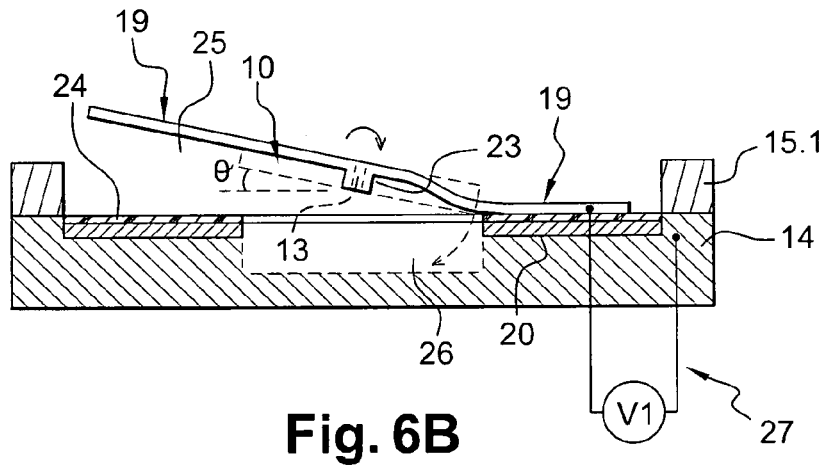

In FIGS. 6A, 6B and subsequent figures, the torsion arms 13 are in the extension of drive arms 23. In practice a torsion arm 13 has a transverse section which is smaller than that of a drive arm 23 and this transverse section gives it a certain flexibility under torsion. The drive arm 23 has a larger transverse section in order that it remains stiff when being driven.

Thus the dimensioning of torsion arms 13 may be optimised so that they are sufficiently flexible under torsion and sufficiently stiff in vertical flexion. It is advantageous for them to be relatively thin and for their width to be less than their thickness. If the torsion arm 13 is not sufficiently stiff under vertical flexion, actuator 19 will tend to draw moving part 10 downwards rather than drive it in rotation. The movement of the moving part 10 might then not be pure rotation, which would give lateral translation movement to a reflected or transmitted light beam resulting from a light beam incident on the reflective or refringent zone 17.

Explanations will now be given of the operation of such a micro-mirror or a micro-lens capable of being actuated in rotation about an axis.

Figure 6C:
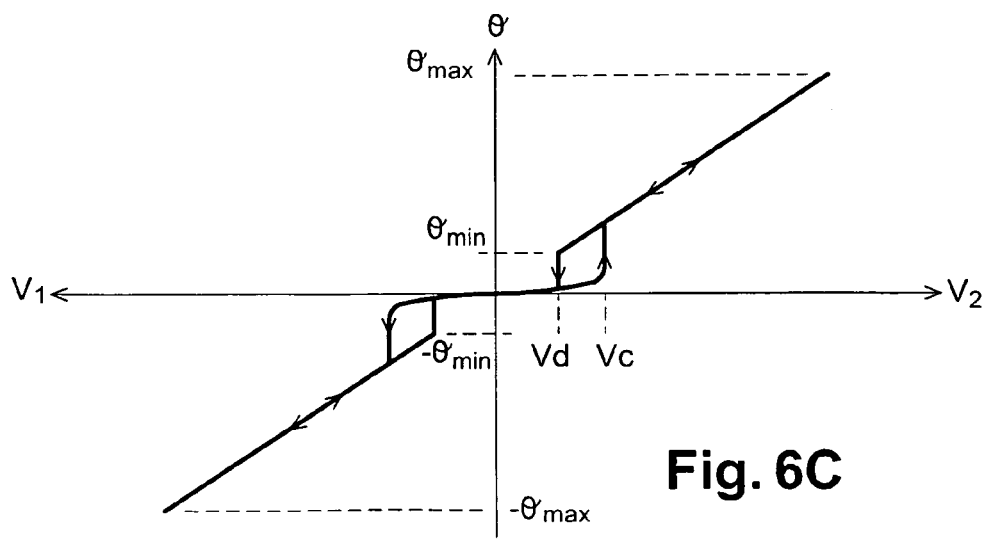
FIG. 6C represents the variation of the angle of inclinations of the moving part of the micro-mirror or micro-lens as a function of the voltage applied in this mode of operation.

Reference is made to FIGS. 6A, 6B and to the graph in FIG. 6C. It is assumed that in this first mode of operation, the actuators 19 located on one side and the other of the axis 12 are actuated separately. Addressing device 27 actuates either one or more actuators located on one side of the axis 12, or one or more actuators located on the other side of axis 19.

At rest the moving part 10 is in an substantially horizontal position (angle of inclination θ zero) and the addressing device 27 not applying actuation voltage to electrodes 20, 21. of these actuators 19. The actuators 19 are not addressed. Refer if necessary to FIG. 4C. There is no attraction between the moving electrode 21 and the fixed electrode 20 of one of the actuators 19. The electrodes 20, 21 of actuators 19 are separated and the moving part 10 in the resting position.

When the addressing device 27 starts applying an initial addressing signal, namely an actuation voltage V1 between the two fixed 20 and moving 21 electrodes of one of the actuators 19 (or of several actuators located on the same side of axis 12) placed to the right in the figures illustrating this example of operation, nothing happens until the voltage V1 reaches the attraction threshold voltage Vc. At this point the free end 21.1 of the moving electrode 21 adheres to the fixed electrode 20 opposite it. Thus the adhesion of two electrodes at their ends has occurred. The actuator 19 applies a force to the drive arm 23 towards the right. In this state the moving part 10 and therefore the reflective or refringent zone 17 has turned suddenly through an angle of θ greater than +θmin (+θmin represents the minimum angle of inclination taken by the moving part 10 in relation to its position of rest). The edge of moving part 10 which is located on the same side of the axis (that is of torsion arm 13) as the moving electrode 21, which has-adhered to the fixed electrode drops and the opposite edge rises.

On increasing the actuation voltage V1 the moving electrode 21 adheres more and more strongly to the fixed electrode 20. The adhesion spreads in the direction of the drive arm 23. The surface of adhesion approaches the drive arm 23. The moving part 10 inclines more and more until it reaches and angle +θmax which corresponds in a favourable case, to a position in which all the moving electrode 21 is adhered to the fixed electrode 20 if the moving part 10 does not strike the bottom of the recess 26 beforehand. The angle Omax corresponds in the best case to the angle made by the moving part when the addressing device supplies the maximum addressing voltage. As explained earlier, when the actuation voltage V1 decreases, the moving part 10 behaves as previously but in the reverse direction; the moving electrode 21 gradually separates from fixed electrode 20. When the actuation voltage reaches the separation threshold voltage Vd, only the end 21.1 of the moving electrode 21 remains adhered to the fixed electrode 20. The angle θ decreases. When this voltage Vd is applied, the moving part 10 moves to the position +θmin. Voltage Vd is less than voltage Vc. When the voltage decreases to below Vd, the moving electrode 21 separates from fixed electrode 20 and the moving part 10 returns to its substantially horizontal rest position. The actuation voltage V1 is then cancelled.

When the addressing device 27 supplies a second addressing signal to actuate the other actuator or actuators 19 located on the other side of the axis 12 (on the left of the figures), that is, an actuation voltage V2 (not shown), the moving part 10 inclines in the opposite direction. The inclination occurs from an angle θ greater than −θmin to an angle −θmax as the actuation voltage V2 is increased. Conversely, when the actuation voltage V2 is decreased, the angle of inclination θ decreases until it reaches −θmin.

With such a mode of operation, the moving part 10 can then move in rotation in two separate ranges of angles [−θmax, −θmin] and [+θmin, +θmax] and/or take a fixed position within these ranges. On the other hand the range of angles [−θmin, +θmin] cannot be covered. A continuous sweep by the moving part 10 within the range of angles [−θmin, +θmin] cannot be achieved. This last range cannot be used for moving part 10. In this mode of operations Vi and V2 never differ from a zero value together. For an actuation voltage which is non-zero but which is less than the attraction threshold voltage Vc, the electrodes of an actuator start to approach each other, the inclination of the moving part is small but not zero. It would of course be possible for the addressing device 27 to simultaneously actuate actuators 19 located on either side of the axis 12.

Figure 7:
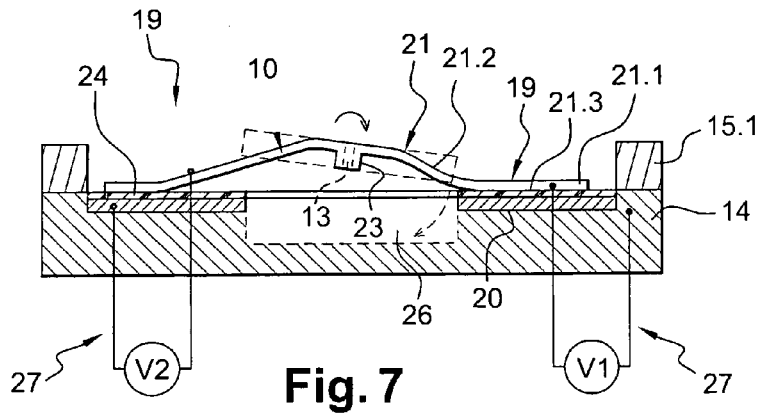
FIG. 7 is a section of the micro-mirror or of the micro-lens in FIG. 5, intended to explain a second mode of operation.

Reference should be made to FIG. 7 which shows a second mode of operation of the micro-mirror or micro-lens as described in the invention.

The addressing device 27 now applies an initial actuation voltage V1 to the electrodes 20, 21 of one or more actuators 19 located on one side of the axis 12 (to the right in the example) and simultaneously a second actuation voltage V2 to electrodes 20, 21 of one or more actuators 19 located on the other side of the axis 12 for example to the left). By selecting appropriate values for these actuation voltages V1, V2 the moving part 10 can be made to take up all possible inclinations in a range of angles [−θmax, +θmax]. By varying the voltages V1 and V2 over time, the moving part 10 can be given a sweeping motion in rotation between −θmax, +θmax.

In order to facilitate the adjustment of the position or of the movement of the moving part 10, it is possible for the addressing device 27 to continuously supply a continuous non-zero voltage V0 to the actuators 19 with this voltage V0 being added to a control voltage V1' or V2' which can vary with time and which can be cancelled. The continuous voltage V0 is the minimum voltage for maintaining adhesion of moving electrode 21 against fixed electrode 20. It is greater than the separation threshold voltage Vd. We then get:

$$V1 = V0 + V1'$$

$$V2 = V0 + V2'$$

V1'≠0 where V2'=0 and V2'≠0 and V1'=0.

The control voltages V1' and V2' are never zero at the same time Let us assume that one wishes to turn the moving part to the right. If V1' is not zero, adhesion of the moving electrode spreads to the right and the moving part turns to the right. But if at the same time V2' is also non-zero the adhesion will also spread to the left which opposes the rotation of the moving part to the right. It is irrelevant whether the control voltages V1' and V2' are either positive or negative.

The addressing device 27 for actuators 19 may act either on the fixed electrodes 20 or on moving electrodes 21 or even on the two fixed 20 and moving 21 electrodes, but this is more complicated. Non-addressed electrodes are at earth potential. Since control of the actuators located on one side of the axis is independent of those located on the other side of the axis, this means that the fixed electrodes 20 or moving electrodes 21 located on one side of the axis 12 are electrically insulated from those located on the other side of the axis 12. This insulation may be achieved in a standard manner by depositing discrete conductors which are not connected, by insulation trenches, for example by trenches of air or trenches filled with a dielectric material in conductive zones, or by ion implantation of doping zones opposite those of the substrate in which the zones are located.

If the fixed electrodes 20 are addressed, conductors which join these may be made on the base (not shown), beneath the dielectric layer 24, with the moving electrodes 21 being kept at a given potential (generally earth potential).

If it is the moving electrodes 21 that are addressed, all fixed electrodes 20 may be maintained at the same potential. In this case the fixed electrodes 20 may be combined and may form a single fixed electrode as will be seen later.

Figure 8A:
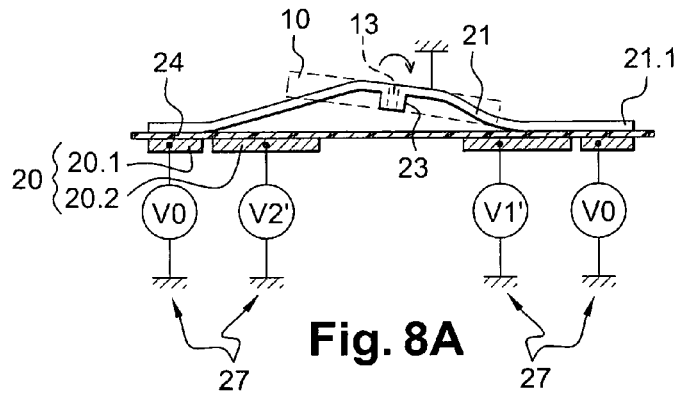
FIG. 8A is a section of the micro-mirror or micro-lens in FIG. 5, intended to explain a variant of the second mode of operation

In the case where addressing is carried out from fixed electrodes 20, it is possible to split the fixed electrodes 20 into two distinct portions which are electrically insulated from each other. The first portion 20.1, which corresponds to the part onto which the free end 21.1 (or the stub 21.3) of the moving electrode 21, must adhere when a continuous voltage V0 is supplied to it which is greater than the separation threshold voltage Vd as explained previously. This keeps the free end 21.1 of the moving electrode 21 adhered to the fixed electrode 20. The second portion 20.2, which corresponds to the part to which the body 21.2 of the moving electrode 21 should be adhered. The control voltage V1' of V2' is applied to it, depending on whether it is on one side or the other of the axis 12. This variant is illustrated in FIG. 8A. The advantage of this structure in relation to the configuration in FIG. 7 is that it simplifies the operation of the addressing device 27. There is no purpose in adding the continuous voltage V0 to the control voltage V1' or V2'.

Figure 2C:
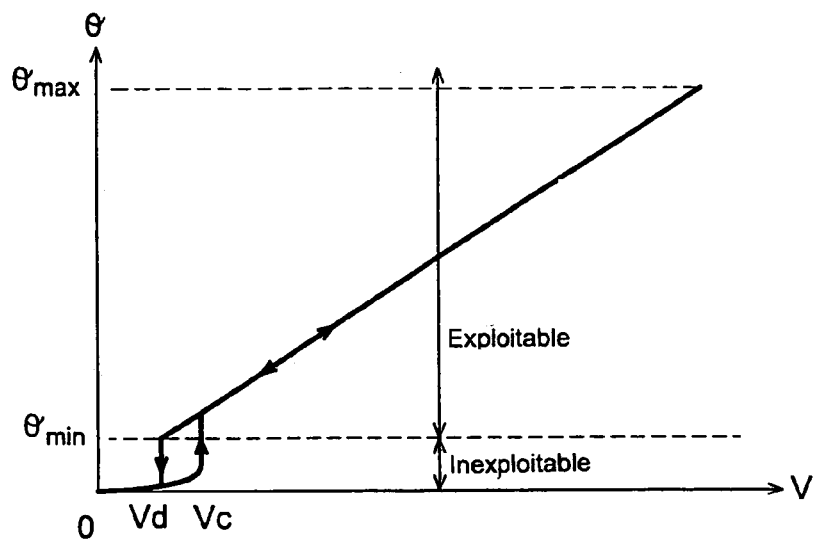
FIG. 2C illustrates the angle of inclination of the moving part of the micro-mirror as a function of the voltage applied.
Figure 3:
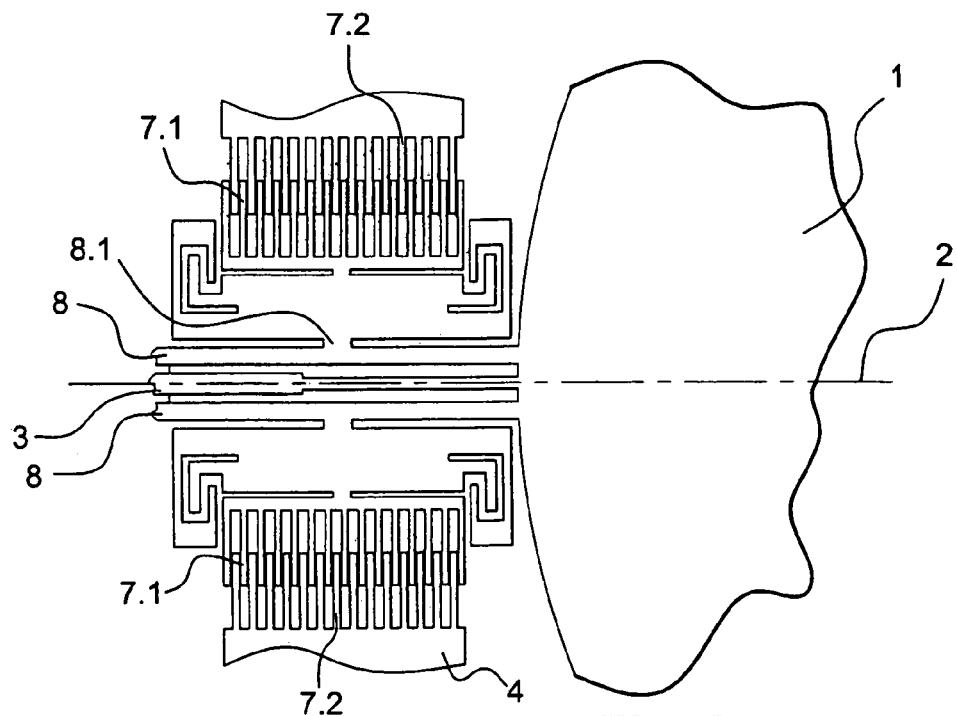
FIG. 3 (already described) is a top view of a micro-mirror capable of being actuated in rotation using interdigital electrodes in the form of a comb.
Figure 8B:
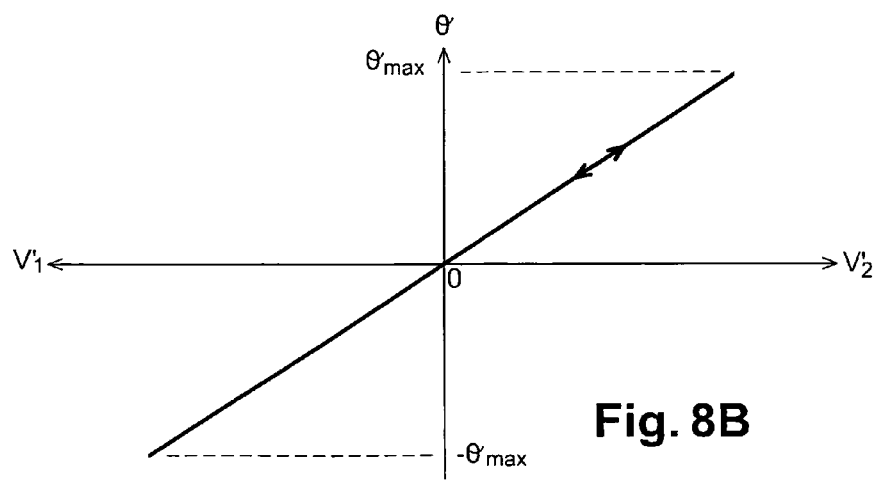
FIG. 8B represents the variation of the angle of inclination of the moving part of the micro-mirror or micro-lens as a function of the voltage applied in this mode of operation.

In relation to the examples in FIG. 2, the amplitude of movement of the moving part 10 is doubled. FIG. 8B represents the response curve (angle of rotation θ as a function of operating voltages V1' and V2' applied to the left and right actuators respectively of the micro-mirror or of the micro-lens shown in FIG. 8A. The variation of the angle of inclination is linear and continuous between −θmax, +θmax.

In both examples described it would of course be possible for the addressing device 27 to simultaneously actuate the actuators 19 located on one side or the other of the axis 12, the control voltages would both be non-zero at the same time.

The fact that the cavity 26 is located beneath the moving part 10 means that the size of the moving part and consequently the size of the reflective or refringent zone may be increased without having to increase the actuation voltage.

Such a micro-mirror or micro-lens is particularly well suited to use in static or quasi-static mode at a frequency very much lower than the mechanical resonance frequency with large amplitude. Use in resonance mode is possible, however, if the actuation voltages of the actuators are alternating (for example sinusoidal) at substantially the resonance frequency.

Figure 9:
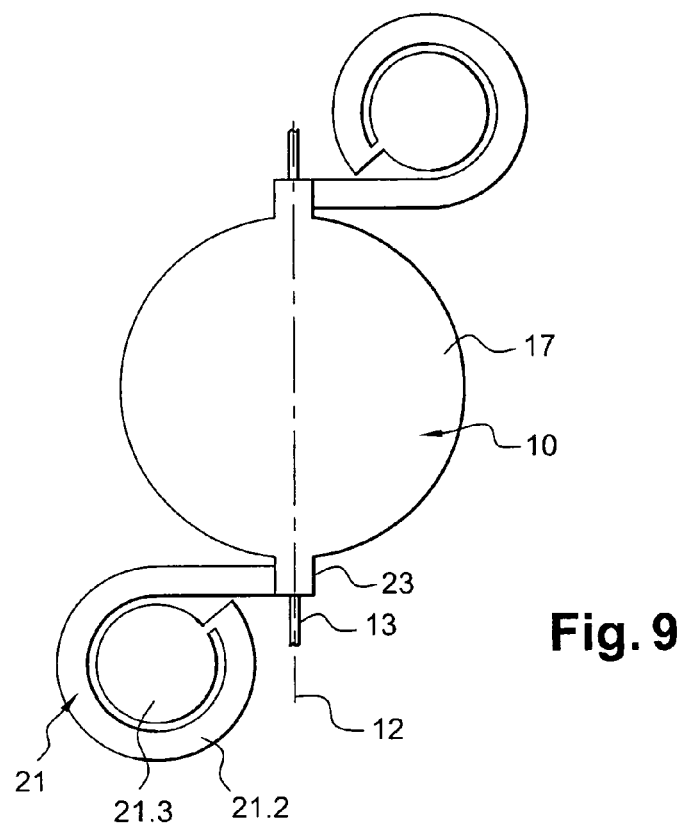
FIG. 9 is a partial top view of another example of a micro-mirror as described in the invention with wound moving electrodes.

Reference should now be made to FIG. 9 which shows a configuration variant for the fixed electrodes 20 and moving electrodes 21 of an actuator 19 of a micro-mirror. This could of course involve a micro-lens. Instead of the moving electrode 21 including a rectilinear body 21.2 with possibly a stub 21.3 at the end, it is possible for the electrode to be wound on itself substantially as a spiral, with the free end 21.1 or stub 21.3, if it exists, being substantially located at the centre of the winding. This variant is illustrated in FIG. 9. The micro-mirror is thus more compact than with rectilinear moving electrodes 21. It would be the same for the micro-lens.

Figure 10:
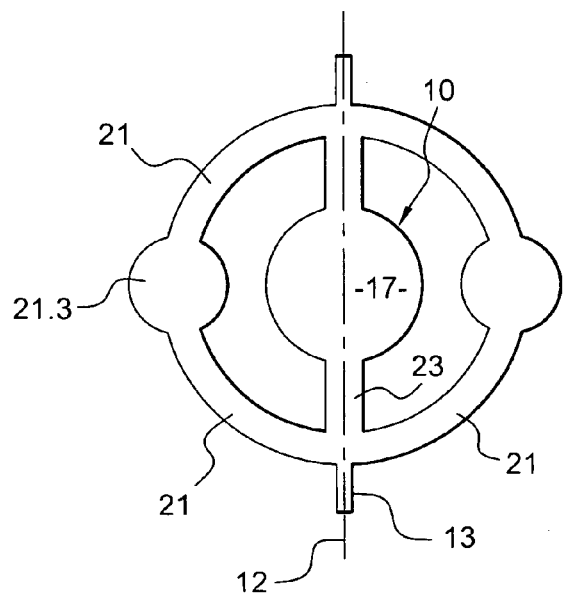
FIG. 10 is a partial top view of another example of a micro-mirror as described in the invention in which the free ends of moving electrodes of actuators located on the same side of the axis are common.

In order to simplify the addressing of actuators and to increase the compactness of the micro-mirror, it is possible for two or more moving electrodes 21 belonging to actuators 19 and located on the same side of the axis 12 to have their free end 21.1 in common, whether they have a stub 21.3 or not. This variant is represented in FIG. 10. This could of course also involve a micro-lens. The advantage of this configuration is to ensure that adhesion occurs at exactly the same instant for the corresponding actuators 19.

An example of a process for manufacturing a micro-mirror or a micro-lens in accordance with the invention will now be described.

It is assumed that the addressing device applies the appropriate voltages to the moving electrodes of the actuators in order to move the moving part in rotation whilst the fixed electrodes are at a constant voltage (generally earth voltage). Reference should be made to FIGS. 11A to 11L. It is assumed that the semi-conductor substrates are conductive.

The first substrate 100 used is formed of a base layer 101 made of semi-conductive material, for example silicon, covered with a sandwich 102 made up of two insulating layers 102.1, 102.2 (for example silicon oxide) located on either side of an intermediate layer 102.3 made of semi-conductive material (for example silicon), with the sandwich 102 being itself covered by a surface layer 103 made of semi-conductor material (for example silicon). This substrate is shown in FIG. 11A. The insulating layer referenced 102.1 is the lower layer of the sandwich and the layer 102.2 is the upper layer of the sandwich. Such a substrate 100 could be a double SOI (English abbreviation for Silicon on Insulator) substrate. The surface layer 103 is thicker than the intermediate layer 102.3. The layers made up of semi-conductor material 101, 102.3, 103 are conductive.

It is assumed that in this example the micro-mirror and micro-lens are similar to those in FIGS. 5A, 5B, with the drive arm and torsion arm being end-to-end.

A start is made by marking out, using a photolithographic step, the pattern of a first region of the fixed part 14, namely the frame 15.1 or the columns, of a first region of the moving part 10, of a first region of the torsion arms 13 and drive 23 arms. The various elements are then etched in the surface layer 103 and in the upper insulating layer 102.2 (FIG. 11B). This etching step may be a dry etching step. The first regions are therefore formed from the semi-conductive material of the surface layer and of the material in the upper insulating layer. If a micro-mirror is made, the moving part 10 is left intact, whereas if a micro-lens is made, the moving part 10 is etched as a frame with a central cavity. This frame etching is outlined in dotted lines in FIG. 11B.

The moving electrodes of the actuators will in turn be made in the intermediate layer 102.3 later.

The torsion arms, the frame and the moving part will serve to channel the addressing signal to the moving electrodes of the actuators. These addressing signals travel through the frame and the torsion arms from contact pins carried by the frame and made later. One of the torsion arms will be used for addressing of the actuators located on one side of the axis and the other torsion arm for addressing of the actuators located on the other side of the axis. In order that the addressing signals destined for the moving electrodes located on one side of the axis do not travel to the moving electrodes located on the other side of the axis, which must receive other addressing signals, insulation trenches 104 in the frame 15.1 and an insulation trench 106 (at the first region of the moving part 10) are made in the surface layer 103 and also in the upper insulating layer 102.2. These trenches may be trenches of air or later filled with a dielectric material. If instead of a frame, two columns as in FIG. 4 are provided, these are electrically insulated as a result of their configuration. The insulation trenches 104 cut the frame 15.1 into two parts 105.1, 105.2. The one has to hold one of the contact pins, which transmits one of the addressing signals and the other part 105.2 must hold the other contact pin which transmits the other addressing signal. The pins are not visible at this stage (FIG. 11C). In the same way, the superficial layer 103 which corresponds to the first region of the moving part 10 is separated into two parts 107.1, 107.2 by the insulation trench 106. One of the torsion arms emerges from one of the parts 107.1 and the other from the other part 107.2. The insulation trench 106 is for the most part directed along the axis of rotation 12. The insulation trench 106 is visible in FIG. 11C.

In a second semi-conductor substrate 200 (made for example from 'silicon) which will form a second region of the fixed part 14, namely the base 16, a first part is made by etching a recess 201 which will help form the space 25 between fixed and moving electrodes of the actuators and possible a second recessed part 202 which will form the cavity 26 which must be located beneath the moving part 10. The first recessed part 201 is not as deep as the second recessed part 202.

The second recessed part 202 is located in a central zone of the first recessed part 201. The etching may be dry etching. The second substrate 200 etched in this way will form the fixed electrodes 20 which are therefore combined for all actuators. The fixed electrodes are thus included in the base. The second substrate 200 thus etched is covered with a layer of insulating material 203, for example silicon nitride or an oxide (FIG. 11D). The layer of insulating material 203 forms the insulating layer 24 inserted between the fixed 20 and moving 21 electrodes.

Figure 11E:
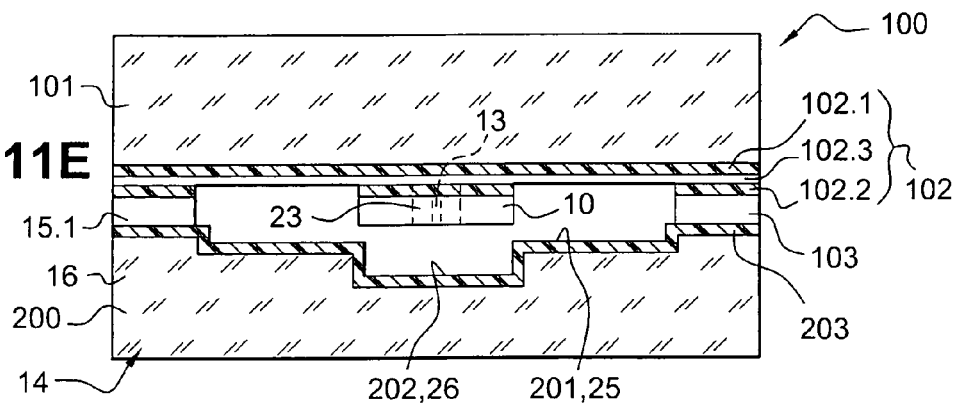

The two substrates 100, 200 are then fixed together by placing the first recessed part 201 against the etched surface layer (FIG. 11E). This fixing could be made by means of a molecular adhesion process after having prepared the surfaces to be assembled in an appropriate manner. Such a molecular adhesion process is known by the English abbreviation SDB—Silicon Direct Bonding. The second recessed part 202 is face to face with the first region of the moving part 10.

Figure 11F:
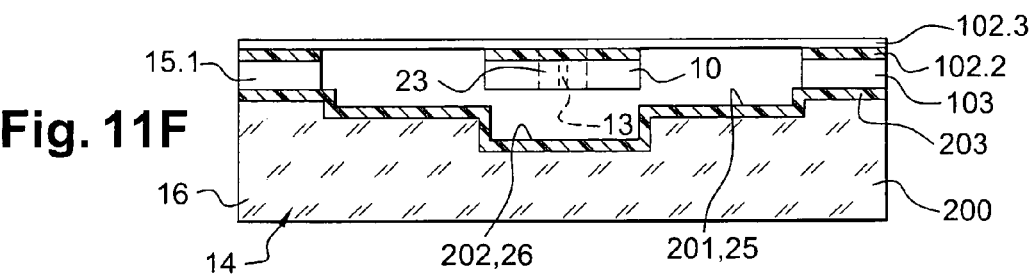

Silicon is removed from the base layer 101 and the lower insulating layer 102.1 of the sandwich 102 of the first substrate 100 by coarse mechanical grinding, for example, followed by wet etching (FIG. 11F).

Figure 11G:
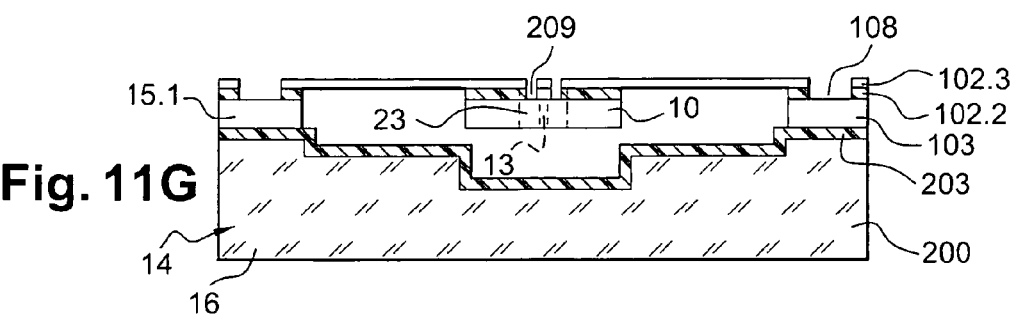
Figure 11H:
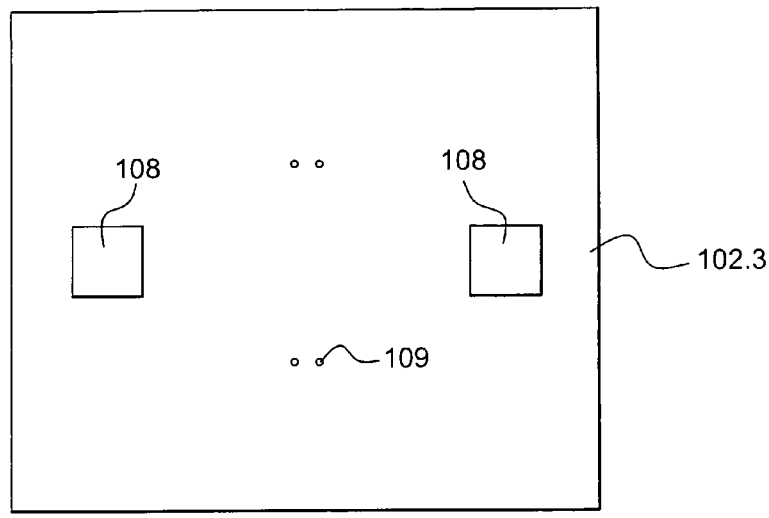

The intermediate layer 102.3 and the upper insulating layer 102.2 are then etched to provide access to superficial layer 103 in order to mark out the contact pins. The zones etched in this way are referenced as 108 in FIG. 11G. Interconnection holes 109 are also etched in the surface layer 103, which once metallised will act as contact points between the moving electrodes and parts 107.1, 107.1 of the first region of the moving part 10. These interconnection holes 109 are cut in the torsion arms 13 in an area where they project from the moving part 10, but other areas are possible. There are as many interconnection holes 109 as there are moving electrodes 21. The contact points allow the said parts 107.1, 107.2 to be electrically connected to the moving electrodes 21. This etching step is shown in FIGS. 11G and 11H.

Figure 11I:
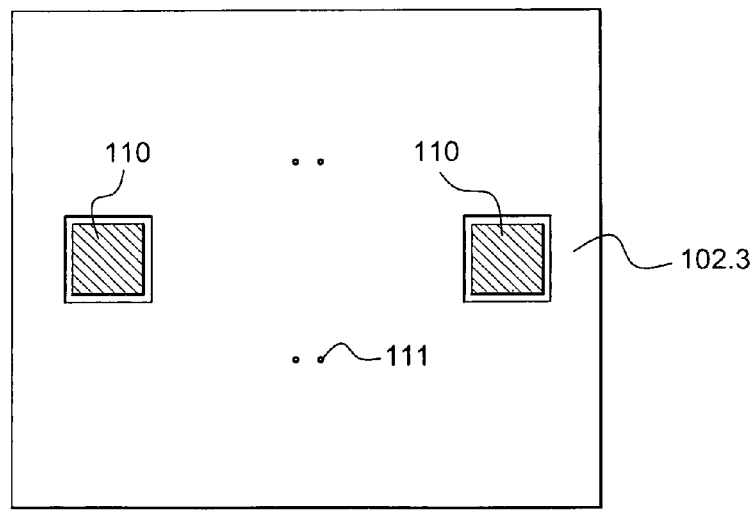

Then metal is deposited so as to form contact pins 110 and contact points 111 in the etched zones 108 and interconnection holes 109 (FIG. 11I). The material deposited may be tungsten, aluminium or any other metal or alloy normally used.

Figure 11J:
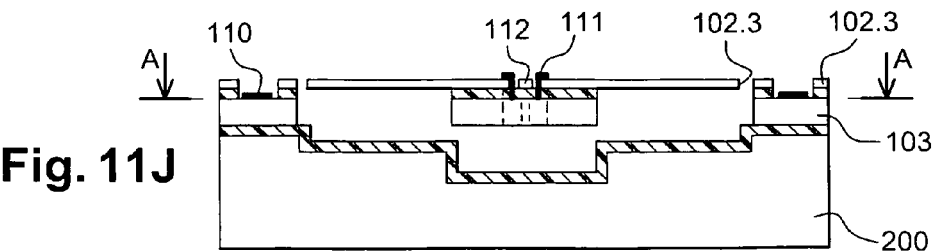
Figure 11K:
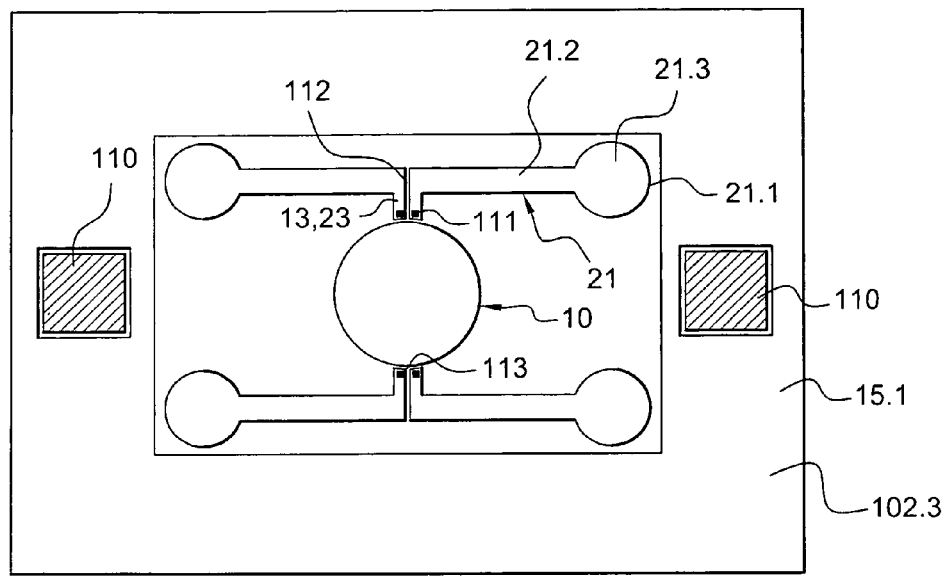

FIGS. 11J and 11K show in section and top view respectively, the result of an etching step in the intermediate zone 102.3, whose objective is to mark out the shape of the moving electrodes 21 with their stubs 21.3 and their bodies 21.2, a second region of the moving part 10, a second region of the torsion bars and drive bars (which are combined). The second region of the moving part, the second region of the torsion arms and the second region of the drive arms are therefore formed using the semi-conductor material of the intermediate layer 102.3.

The first and second regions of the moving part, the torsion arms and drive arms are superimposed and therefore form a stack of the surface layer, of the upper insulating layer and of the intermediate layer. An insulation trench 112 is of course provided between two moving electrodes, located on either side of the axis 12 and which form part of the same torsion arms 13 and an insulation trench 113 is provided between the moving part 10 and the moving electrodes 21.

Figure 11L:
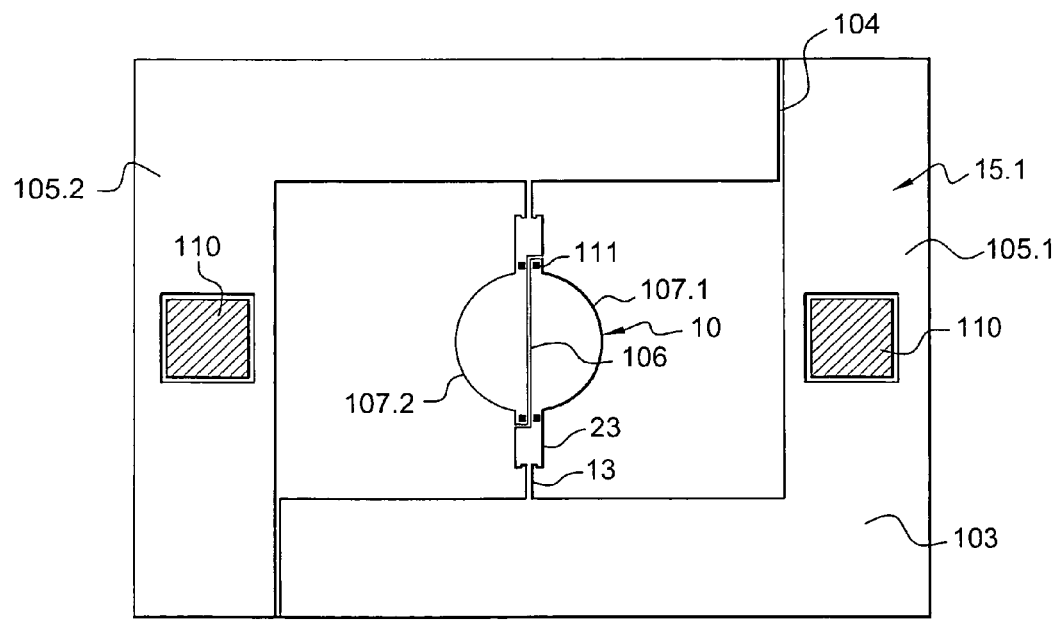

FIG. 11L is a section of the micro-mirror or of the micro-lens in a plane AA of FIG. 11J. Referring to FIG. 11C, there can be seen contact pins 110 and contact points 111.

The reflective zone 17 of the micro-mirror can be made using the semi-conductive material in the intermediate layer 102.3 located in the second region of the moving part 10 if is sufficiently reflective in nature. It is of course possible to create this by metallization of the said second region of the moving part using, for example, gold, silver, aluminium or another metal.

As for the micro-lens, a lenticular refringent pellet could be added, by adhesion, for example, to the frame which forms the moving part 10. This pellet is assumed to be outlined in FIG. 11K. Zone 17 could also represent the reflective zone of the micro-mirror.

The terms <<left>>, <<right>>, <<up>>, <<down>>, <<lower>>, <<upper>>, <<horizontal>>, <<vertical> and other terms are applicable to the modes of manufacture shown and described in connection with the figures. They are only used for the purposes of description and do not necessarily apply to the position taken by the micro-mirror when it is in operation.

Although several methods of manufacture of micro-mirrors have been described, the present invention is not strictly limited to these methods of manufacture. In particular the number of actuators is not restricted to two or four as illustrated. There may be any number whatsoever; there is at least one actuator on one side of the axis and one actuator on the other side.

REFERENCES CITED

[1] "Two-phase actuators: stable zipping devices without fabrication of curved structures", J. R. Gilbert, S. D. Senturia, Solid-state Sensor and Actuator Workshop, June 1996, Hilton Head S.C pages 98-100.

[2] "A micromachined deformable mirror for adaptative optics", W. Schwartz, C. Divoux, J. Margail, L. Jocou, J. Charton, E. Stadler, T. Jager, F. Casset, T. Enot, Proceedings of SPIE 2003, vol. 4985, pages 230-241.

[3] "A scanning micro-mirror with angular comb drive actuation", P. R Patterson, D. Hah, H. Nguyen, H. Toshiyoshi, R. Chao, M. C. Wu, 2002 IEEE, pages 544-547.

The invention claimed is:

1. Micro-mirror made up of a moving part, with a reflective zone, a fixed part, a means of connection of the moving part to the fixed part, forming an axis of rotation contained in the moving part substantially parallel to a principal plane of the moving part and means of electrical control of the rotation of the moving part about the axis, characterized by the fact that the means of electrical control include two or more actuators, each formed of a fixed electrode which forms part of the fixed part and a moving electrode possessing a free end and an end which is connected to a drive arm which is substantially parallel to the axis and emerging from the moving part, with the moving electrode being designed to adhere to the fixed electrode from its free end when an actuation voltage is applied between the two electrodes of one of the actuators, the adhesion occurs over a surface which varies as a function of the voltage applied between the electrodes of the actuator, with the actuators being arranged on either side of the axis.

2. Micro-mirror according to claim 1, wherein the means of connection of the moving part to the fixed part are two torsion arms emerging from the moving part whose ends are connected to the fixed part.

3. Micro-mirror according to claim 2, wherein, on the same side of the moving part, a drive arm is offset in relation to a torsion arm.

4. Micro-mirror according to claim 2, wherein, on the same side of the moving part, a drive arm and a torsion arm are an extension of each other.

5. Micro-mirror according to claim 4, wherein the torsion arm has a transverse section that is less than that of the drive arm.

6. Micro-mirror according to claim 4, wherein the torsion arm has a transverse section that is substantially equal to that of the drive arm.

7. Micro-mirror according to claim 1, wherein the axis passes through the geometric center of the moving part.

8. Micro-mirror according to claim 1, wherein several moving electrodes are linked to the same drive arm.

9. Micro-mirror according to claim 1, wherein each drive arm is integral with a single moving electrode.

10. Micro-mirror according to claim 1, wherein several moving electrodes located on the same side of the axis are linked together at their free end.

11. Micro-mirror according to claim 1, wherein at least one moving electrode is wound on itself, with its free end located in a central area of the winding.

12. Micro-mirror according to claim 1, wherein at least one moving electrode is substantially rectilinear.

13. Micro-mirror according to claim 1, wherein at least one moving electrode includes a body of substantially constant width extending by means of a stub at its free end, the width of the stub being greater than that of the body.

14. Micro-mirror according to claim 1, wherein the fixed electrodes of the actuators are combined.

15. Micro-mirror according to claim 1, wherein the fixed part includes a base and columns on which rest the means of connection, with the moving part being suspended above the base.

16. Micro-mirror according to claim 15, wherein the base includes a cavity opposite the moving part which is suspended above the cavity.

17. Micro-mirror according to claim 1, wherein the fixed electrodes are covered with a dielectric material.

18. Micro-mirror according to claim 1, wherein the means of electrical control include an addressing device capable of applying an actuation voltage to the moving electrodes and/or the fixed electrodes.

19. Micro-mirror according to claim 18, wherein the actuation voltage is a continuous voltage added to a variable control voltage.

20. Micro-mirror according to claim 19, wherein the continuous voltage is a minimal voltage for maintaining adhesion of the free end of the moving electrode of the actuator onto the fixed electrode.

21. Micro-mirror according to claim 19, wherein when the control voltage applied to an actuator located on one side of the axis is non-zero, the control voltage applied at the same time to an actuator located on the other side of the axis is zero.

22. Micro-mirror according to claim 18, wherein at least one fixed electrode of an actuator is divided into two portions one of which is an end portion, with these two portions being insulated from each other, with the addressing device being capable of applying a continuous voltage to the end portion and a variable control voltage to the other portion.

23. Process for the manufacture of a micro-mirror according to claim 1, wherein it includes the following steps:
   a) etching of the outline of a first region of the moving part, of a first region of the fixed part, a first region of the drive arms and of a first region of the means of connection in a surface layer and a first insulating layer of a stratified substrate made up of an alternating stacking of a first and second layer of insulating material and two semi-conductive layers one of which is intermediate and the other of which is a surface layer,
   b) in a second semi-conductive substrate the etching of a recessed part, with this second substrate contributing to the formation of a second region of the fixed part and the fixed electrodes of the actuators,
   c) assembly of two substrates with the recessed part facing the etched surface layer, d) etching of the outline of the moving electrodes, of a second region of the moving part, a second region of the means of connection and of a second region of the drive arms, in the intermediate layer and prior metallization electrically connected to moving electrodes for the application of the actuation voltage of each actuator via the fixed part and the moving part.

24. Process according to claim 23, wherein trenches of insulation are made during step a) in the surface layer and in the upper insulation layer at the first region of the fixed part and the first region of the moving part and in the intermediate layer during step d) at the moving electrodes and the second region of the moving part to provide electrical insulation of the moving electrodes during the application of actuation voltage to a moving electrode via the first region of the fixed part and the first region of the moving part.

25. Process according to claim 23, wherein step b) includes the etching of the cavity in a central part of the recessed part.

26. Process according to claim 23, wherein step b) is followed by a step for the creation of a layer of insulating material on the second etched substrate.

27. Process according to claim 23, wherein the second region of the moving part forms the reflective zone.

28. Process according to claim 23, wherein it includes a step for metallization of the second region of the moving part in order to form the reflective zone.

29. Process according to claim 23, wherein, after assembly, the second insulating layer is removed.

30. Process according to claim 23, wherein the surface layer is thicker than the intermediate layer.

31. Process according to claim 23, wherein the first substrate is a double SOI substrate and includes next to the second insulating layer a semi-conductive base layer which is removed after assembly of the two substrates.

32. Micro-lens made up of a moving part, with a refringent zone, a fixed part, a means of connection of the moving part to the fixed part, forming an axis of rotation contained in the moving part and means of electrical control of the rotation of the moving part about the axis, wherein the means of electrical control include two or more actuators, each formed of a fixed electrode which forms part of the fixed part and a moving electrode possessing a free end and an end which is connected to a drive arm which is substantially parallel to the axis and emerging from the moving part, with the moving electrode being designed to adhere to the fixed electrode from its free end when an actuation voltage is applied between the electrodes of one of the actuators, the adhesion occurring over a surface which varies as a function of the voltage applied between the electrodes of the actuator, with the actuators being arranged on either side of the axis.

33. Micro-lens according to claim 32, wherein the means of connection of the moving part to the fixed part are two torsion arms emerging from the moving part whose ends are connected to the fixed part.

34. Micro-lens according to claim 33, wherein, on the same side of the moving part, a drive arm is offset in relation to a torsion arm.

35. Micro-lens according to claim 33, wherein, on the same side of the moving part, a drive arm and a torsion arm form an extension of each other.

36. Micro-lens according to claim 35, wherein the torsion arm has a transverse section that is less than that of the drive arm.

37. Micro-lens according to claim 35, wherein the torsion arm has a transverse section that is substantially equal to that of the drive arm.

38. Micro-lens according to claim 32, wherein the axis passes through the geometric center of the moving part.

39. Micro-lens according to claim 32, wherein several moving electrodes are linked to the same drive arm.

40. Micro-lens according to claim 32, wherein each drive arm is integral with a single moving electrode.

41. Micro-lens according to claim 32, wherein several moving electrodes located on the same side of the axis are linked together at their free end.

42. Micro-lens according to claim 32, wherein at least one moving electrode is wound on itself, with its free end located in a central area of the winding.

43. Micro-lens according to claim 32, wherein at least one moving electrode is substantially rectilinear.

44. Micro-lens according to claim 32, wherein at least one moving electrode includes a body of substantially constant width extending by means of a stub at its free end, the width of the stub being greater than that of the body.

45. Micro-lens according to claim 32, wherein the fixed electrodes of the actuators are combined.

46. Micro-lens according to claim 32, wherein the fixed part includes a base and columns on which the means of connection rest, with the moving part being suspended above the base.

47. Micro-lens according to claim 46, wherein the base includes a cavity opposite the moving part which is suspended above the cavity.

48. Micro-lens according to claim 32, wherein the fixed electrodes are covered with a dielectric material.

49. Micro-lens according to claim 32, wherein the means of electrical control include an addressing device capable of applying an actuation voltage to the moving electrodes and/or the fixed electrodes.

50. Micro-lens according to claim 49, wherein the actuation voltage is a continuous voltage added to a variable control voltage.

51. Micro-lens according to claim 50, wherein the continuous voltage is a minimal voltage for maintaining adhesion of the fee end of the moving electrode of the actuator onto the fixed electrode.

52. Micro-lens according to claim 50, wherein, when the control voltage applied to an actuator located on one side of the axis is non-zero, the control voltage applied at the same time to an actuator located on the other side of the axis is zero.

53. Micro-lens according to claim 49, wherein at least one fixed electrode of an actuator is divided into two portions one of which is an end portion, with these two portions being insulated from each other, with the addressing device being capable of applying a continuous voltage to the end portion and a variable control voltage to the other portion.

54. Process for the manufacture of a micro-lens according to claim 32, wherein it includes the following steps:
  a) etching of the outline of a first region of the moving part, of a first region of the fixed part, of a first region of the drive arms and of a first region of the means of connection in a surface layer and a first insulating layer of a stratified substrate made up of an alternating stacking of a first and second layer of insulating material and two semi-conductive layers one of which is intermediate and the other of which is a surface layer,
  b) in a second semi-conductive substrate the etching of a recessed part, with this second substrate helping to form a second region of the fixed part and the fixed electrodes of the actuators,
  c) assembly of two substrates with the recessed part facing the etched surface layer, d) etching of the outline of the moving electrodes, of a second region of the moving part, a second region of the means of connection and of a second region of the drive arms, in the intermediate layer and prior metallization electrically connected to moving electrodes for the application of the actuation voltage of each actuator via the fixed part and the moving part.

55. Process according to claim 54, wherein trenches of insulation are made during step a) in the surface layer and in the upper insulation layer at the first region of the fixed part and the first region of the moving part and in the intermediate layer during step d) at the moving electrodes and of the second region of the moving part to provide electrical insulation of the moving electrodes during the application of actuation voltage to a moving electrode via the first region of the fixed part and the first region of the moving part.

56. Process according to claim 54, wherein step b) includes the etching of the means forming the pivot in the recessed part.

57. Process according to claim 54, wherein step b) includes the etching of the cavity in a central part of the recessed part.

58. Process according to claim 54, wherein step b) is followed by a step for the creation of a layer of insulating material on the second etched substrate.

59. Process according to claim 54, wherein the moving part is etched in the form of a frame during step b).

60. Process according to claim 59, wherein it includes a step for assembly of a lenticular refringent element to the frame of the moving part in order to form the refringent zone.

61. Process according to claim 54, wherein, after assembly in step c), the second insulating layer is removed.

62. Process according to claim 54, wherein the surface layer is thicker than the intermediate layer.

63. Process according to claim 54, wherein the first substrate is a double SOI substrate and includes next to the second insulating layer a semi-conductive base layer which is removed after assembly of the two substrates.

* * * * *